(12) United States Patent
Zhang et al.

(10) Patent No.: US 9,619,479 B1
(45) Date of Patent: Apr. 11, 2017

(54) AUTONOMOUS DEDUPLICATION FOR EFFICIENT RECOVERY FOR A DEDUPLICATION SYSTEM

(71) Applicant: Symantec Corporation, Mountain View, CA (US)

(72) Inventors: Xianbo Zhang, Roseville, MN (US); Haibin She, Beijing (CN); Haigang Wang, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 268 days.

(21) Appl. No.: 14/316,632

(22) Filed: Jun. 26, 2014

(51) Int. Cl.
*G06F 17/30* (2006.01)

(52) U.S. Cl.
CPC .............. *G06F 17/30156* (2013.01)

(58) Field of Classification Search
CPC .............................. G06F 17/30156
See application file for complete search history.

(56) References Cited

U.S. PATENT DOCUMENTS

2012/0185447 A1 * 7/2012 Zhang ............... G06F 17/30156
707/693

* cited by examiner

*Primary Examiner* — Etienne Leroux
*Assistant Examiner* — Cindy Nguyen
(74) *Attorney, Agent, or Firm* — Womble Carlyle Sandridge & Rice LLP

(57) ABSTRACT

A method to partition a deduplication pool is provided. The method includes determining that an amount of data in a plurality of data containers of the deduplication pool has reached a data capacity threshold and comparing each data container of the plurality of data containers with at least one other of the plurality of data containers as to amount of shared data. The method includes grouping, based on results of the comparing, the plurality of data containers into a plurality of groups of data containers, with data sharing from each of the plurality of groups of data containers to each other of the plurality of groups of data containers less than a data sharing threshold and data sharing inside each of the plurality of groups of data containers greater than the data sharing threshold.

20 Claims, 5 Drawing Sheets

AUTONOMOUS DEDUPLICATION FOR EFFICIENT RECOVERY FOR A DEDUPLICATION SYSTEM

BACKGROUND

Deduplication systems apply deduplication of data when performing backups from clients or client-policy pairs. As client data stored in data containers in data storage grows into the terabyte range, and on into the petabyte range and beyond, managing a deduplication pool becomes more and more unwieldy. Disaster recovery is likewise predicted to take longer if a deduplication system suffers from data loss or corruption due to hardware failure or filesystem failure. With a traditional deduplication approach, the sizes of the global fingerprint index and reference database are proportional to the number of unique data segments stored within a deduplication pool. At some point, a deduplication pool can grow so large that the recovery process takes an unacceptable length of time and breaks a service level agreement with a client. Scalability of deduplication systems is thus in jeopardy.

It is within this context that the embodiments arise.

SUMMARY

In some embodiments a method to partition a deduplication pool is provided. The method includes determining that an amount of data in a plurality of data containers of the deduplication pool has reached a data capacity threshold and comparing each data container of the plurality of data containers with at least one other of the plurality of data containers as to amount of shared data. The method includes grouping, based on results of the comparing, the plurality of data containers into a plurality of groups of data containers, with data sharing from each of the plurality of groups of data containers to each other of the plurality of groups of data containers less than a data sharing threshold and data sharing inside each of the plurality of groups of data containers greater than the data sharing threshold, wherein at least one method operation is executed through a processor.

In some embodiments a non-transitory, tangible, computer-readable media having instructions thereupon which, when operated by a processor, cause the processor to perform actions is provided. The actions include determining which pairs of data containers from a plurality of data containers with data from data deduplication have data sharing greater than a threshold and which pairs of data containers from the plurality of data containers have data sharing less than the threshold. The actions include partitioning the plurality of data containers into a plurality of sets of data containers according to the determining, wherein each pair of data containers that has data sharing greater than the threshold has both data containers of the pair of data containers in a same one of the plurality of sets of data containers, and wherein each pair of data containers that has data sharing less than the threshold has each data container of the pair of data containers in a differing one of the plurality of sets of data containers.

In some embodiments a deduplication system is provided. The deduplication system includes a plurality of data containers configured to store data segments from deduplication of data and configured to serve as a deduplication pool. The system includes a processor configured to perform actions including comparing each of the plurality of data containers to others of the plurality of data containers as to data sharing. The actions include partitioning the plurality of data containers into a plurality of groups of data containers, each container of each one of the plurality of groups having data sharing greater than a threshold with at least one other container in the one of the plurality of groups, each container of each one of the plurality of groups having data sharing less than the threshold with each container in each other one of the plurality of groups.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Traditionally, deduplication as applied to backup processes relies on a single, large deduplication pool and ignores the fact that much of the data protected under different clients and different backup policies may not share very many data segments. The majority of the data segment duplicates come from the same or similar data sources, because these sources are backed up again and again. The embodiments of a deduplication system described below automatically partition the deduplication pool so as to streamline and reduce the amount of time in a recovery process.

In some embodiments, when the deduplication pool capacity becomes relatively large, a reference management database on data sharing may be used to determine the relationship of images from different client-policy pairs. The deduplication system then groups data containers, along with the corresponding reference databases and associations with client-policy pairs into autonomous partitions. Each partition (or group) has a set of data containers referenced by the backup images from client-policy pairs associated with that partition. Each partition has a corresponding reference database managing data container references for the set of containers. There is no or minimal data segment sharing across partitions in some embodiments. Data containers are stored with a minimal number of filesystems that are created over independent LUNs (logical unit numbers). Under some circumstances, filesystem or hardware failure would cause data loss or corruption within a limited number of partitions. A recovery process would then be run for the affected partitions. This prevents the recovery time from growing with the increased deduplication pool capacity. Such a damage localization mechanism helps ensure the scalability of a deduplication system recovery. Partitioning the deduplication pool further provides for more efficient deduplication, since fingerprints of data segments are compared across containers in a group of data containers, and not across all of the groups.

Figure 1:
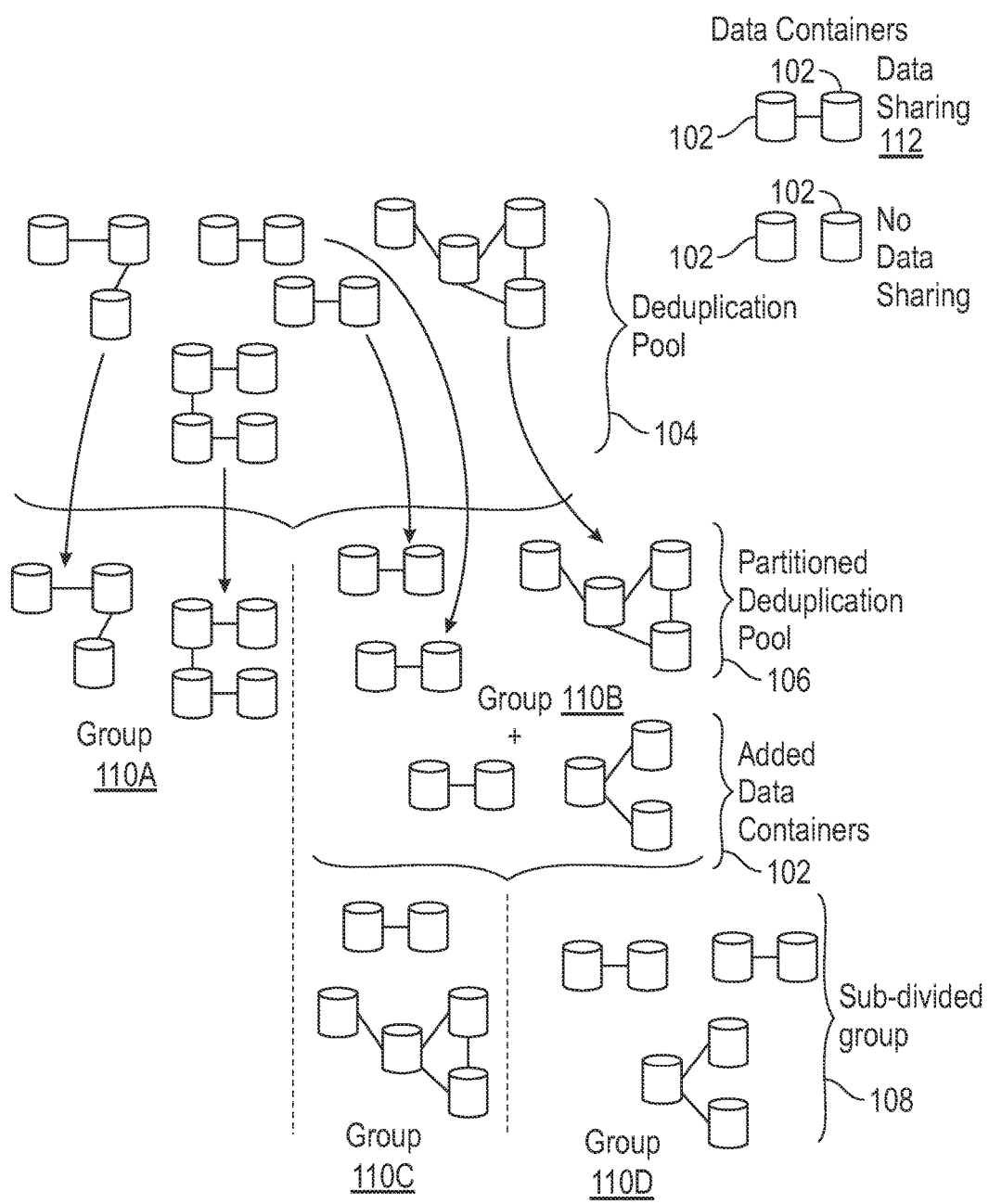
FIG. 1 illustrates partitioning of a deduplication pool in a deduplication system, in accordance with some embodiments.
Figure 2:
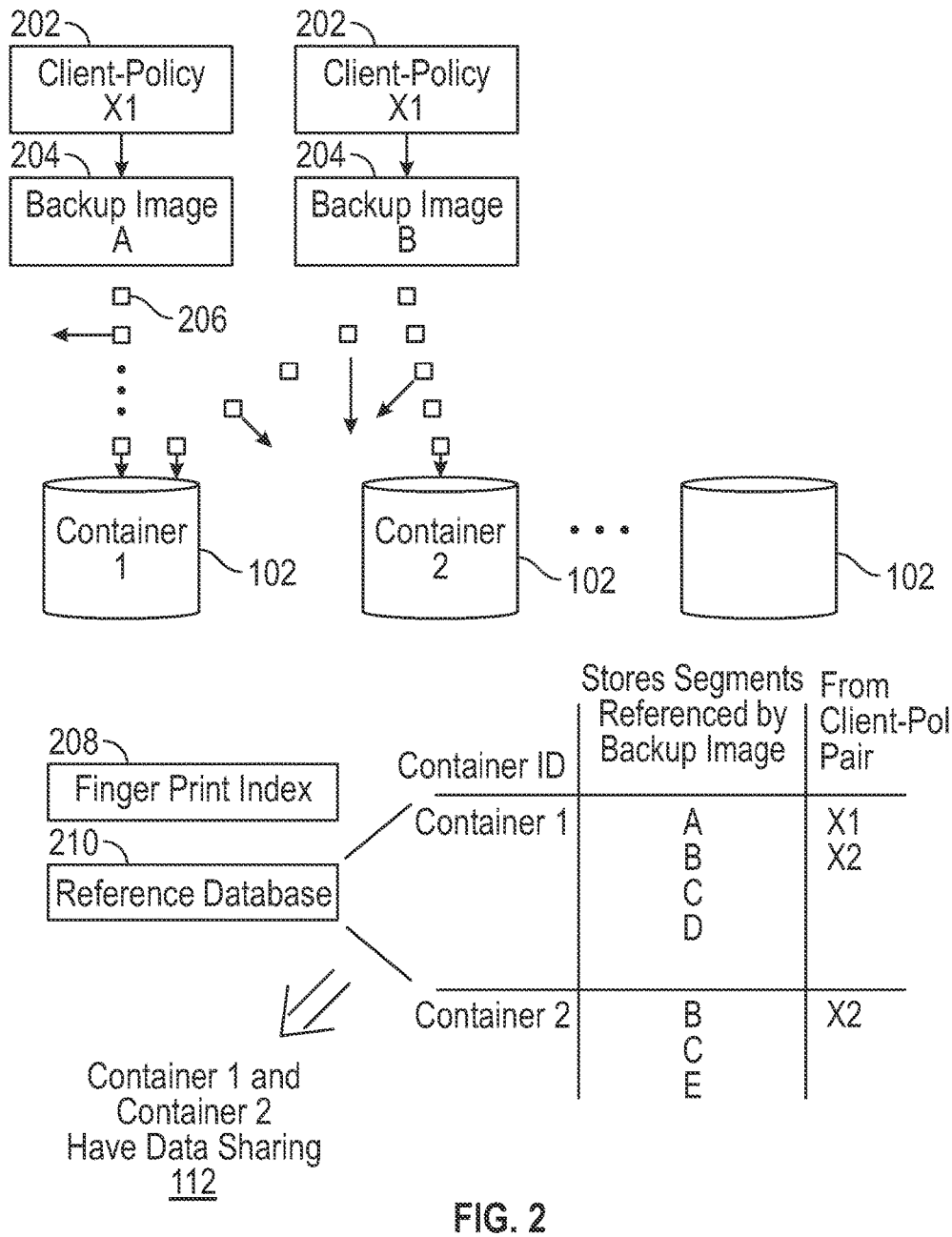
FIG. 2 shows deduplication of data from client-policy pairs, with data segments being stored in data containers that have data sharing and are candidates for the partitioning shown in FIG. 1 in accordance with some embodiments.
Figure 3:
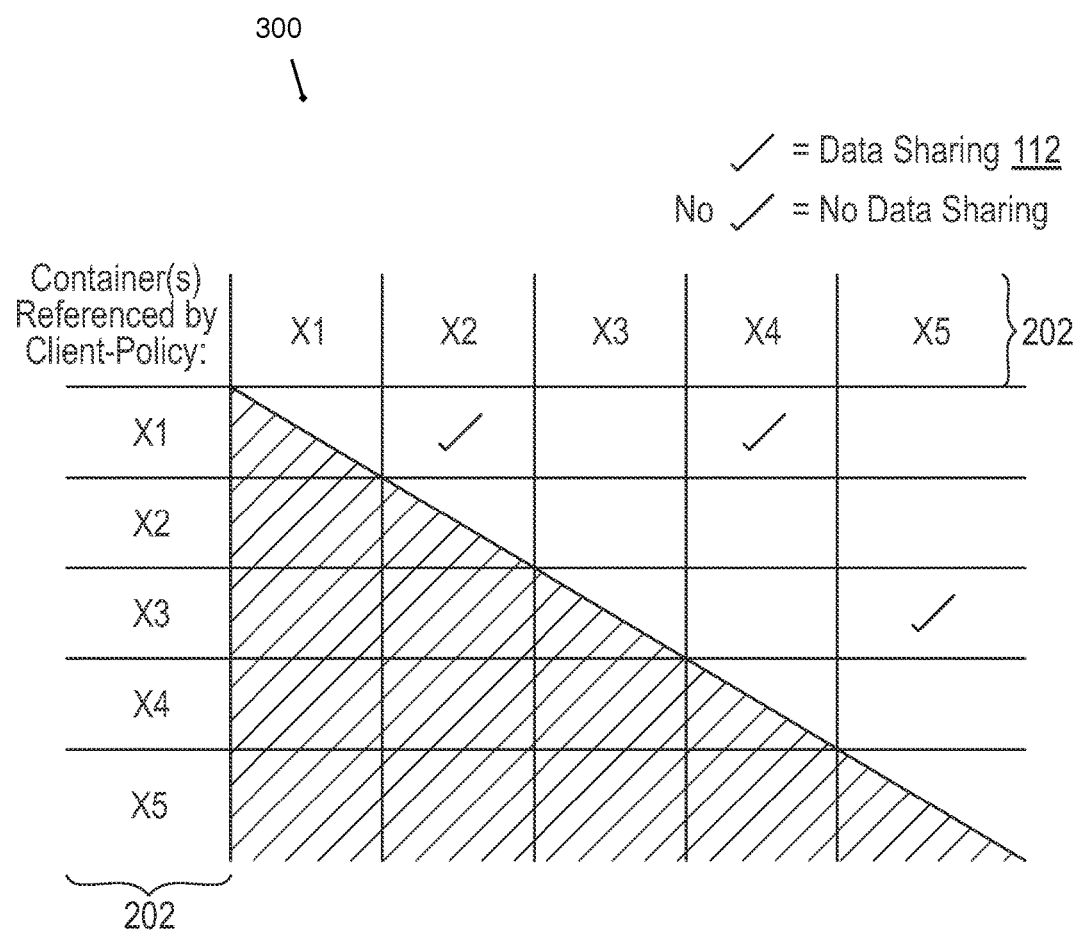
FIG. 3 is a chart showing data sharing among containers referenced by various client-policies, as applicable to the partitioning shown in FIG. 1 in accordance with some embodiments.

FIG. 1 illustrates partitioning of a deduplication pool 104, in a deduplication system, in accordance with embodiments of the present disclosure. Data containers 102 with data sharing 112, as will be further described with reference to FIGS. 2 and 3, are indicated by a line segment connecting the data containers 102. In some embodiments, container data sharing refers to data containers 102 containing data segments that are referenced by the same set of backup images. That is, the data segments stored in two or more data containers 102 are shared or referenced by the same set of backup images or files. Data containers 102 with no data sharing are shown without the line segment connecting the containers 102. Various combinations of data containers 102 with data sharing and with no data sharing are shown in the example of FIG. 1, which should be considered illustrative and not limiting. When the deduplication pool 104 reaches a deduplication pool capacity threshold, the deduplication system partitions (shown as dashed lines) the deduplication pool 104 into two or more groups 110a-d of data containers 102. In some embodiments the deduplication pool capacity threshold is a threshold representing an amount of data stored within the deduplication pool 104. Data containers 102 are placed into the groups 110a-d by a serial or parallel process, or a combination of serial and parallel processes. There is data sharing 112 among containers 102 within each group 110a-d, and relatively little or no data sharing from one group 110 to another group 110. Partitioning may be accomplished by evaluating one data container 102 at a time for determination into which group 110 the data container 102 should be placed. The partitioning could be accomplished in an iterative sequence with successive data containers 102 being compared to other data containers 102 in some embodiments. Alternatively, the partitioning could be accomplished in parallel across subsets of the data containers 102 or across the entire deduplication pool 104, e.g., by multiprocessing or multithreading. In some embodiments, two data containers 102 that have data sharing greater than or equal to the data sharing threshold could be placed into the same group 110. Two data containers 102 that have data sharing less than the data sharing threshold could be split, with one data container 102 placed into one group 110 and the other data container 102 placed into another different group 110. Further embodiments could combine iterative sequences and parallel processing. In some embodiments, if two containers have data sharing less than a threshold, the shared data may be duplicated from one container to a different container to break the sharing. Thus, after data duplicates are made, the two data containers are not referenced by the same set of backup images any longer.

In the example depicted in FIG. 1, the data containers 102 are analyzed as to data sharing 112 among the data containers 102. Containers 102 with data sharing 112 are placed into one group 110a or another group 110b, thus forming the partitioned deduplication pool 106. This is illustrated in FIG. 1 by arrows showing the placement of data containers 102 with data sharing 112 into each of the groups 110a and 110b. Two containers 102 that have no data sharing with each other may be placed into a group 110 if each of these two containers 102 has data sharing 112 with at least one other container 102 in that group 110 in some embodiments. However, containers that have data sharing 112 with each other should not be placed in differing groups 110. In some embodiments there should be no data sharing across partition boundaries. In some embodiments, containers 112 that have less data sharing than the data sharing threshold are considered to have insufficient data sharing for placement into the same group 110. Container data sharing can be broken up with making duplicates from one container to the other one. Containers 112 that have more data sharing than the data sharing threshold (e.g., greater than or equal to the data sharing threshold) are considered to have sufficient data sharing for placement together into a same group 110. The data sharing threshold could be set or adjusted based on how many groups 110 of data containers 102 are formed in the partitioning, the capacity of one or more of the data containers 102, the total capacity of all of the data containers 102 in the deduplication pool 104 or a group 110, or the relative utilization of one or more of the data containers 102 in some embodiments. Although the deduplication pool 104 is shown partitioned into two groups 110a and 110b, a larger number of groups 110 could be employed as FIG. 1 is illustrative and not meant to be limiting.

Continuing with the example of FIG. 1, further data containers 102 are added to group 110b. When this (or any other) group 110 exceeds a specified size, the group 110b is partitioned in a related manner as the original partitioning described above. This specified size could be the same as the deduplication pool capacity threshold, or could be some other size, larger or smaller. The continued partitioning of the group 110b produces a subdivided group 108, which has two or more further groups 110c and 110d of data containers 102.

FIG. 2 shows deduplication of data from client-policy pairs 202, with data segments 206 being stored in data containers 102 that have data sharing 112 and are candidates for the partitioning shown in FIG. 1. It should be appreciated that a client-policy pair 202 refers to a client paired with one or more policies. In this example, a backup of data from client-policy pair 202 "X1" is producing a backup image 204 "A". Some of the data segments 206 from the data associated with client-policy pair 202 "X1" are stored in the container 102 "1", and other data segments 206 are discarded since they match the fingerprint index 208 and thus have copies already stored per deduplication procedures. Similarly, a backup of data from client policy pair 202 "X2" is producing a backup image 204 "B". Some of the data segments 206 from the client-policy pair 202 "X2" are stored in the container 102 "1", some of the data segments 206 are stored in the container 102 "2", and some of the data segments 206 are discarded since they match the fingerprint index 208.

As can be determined by analyzing the data segments 206 in the containers 102 and the client-policy pairs 202 that reference these data segments 206, containers 102 "1" and "2" have data sharing 112. Although such analysis may be performed by accessing the contents of the containers 102 and/or by accessing the backup images 204, a more efficient mechanism employs access to the reference database 210, in one embodiment. The reference database 210 includes a list of container identifiers (IDs). For each data container 102 on the list in the reference database 210, there is a list of backup images that reference segments stored in that data container 102. For each backup image, there is a corresponding client-policy pair indicated in the reference database 210. In some embodiments, the correspondence between backup image and client-policy pair is provided elsewhere, such as in another database or data structure. Data sharing 112 relationships among data containers 102 are determined, for example, by a processor of a deduplication system accessing the reference database 210. Two containers that store segments referenced by backup images from the same client-policy pair are considered to have data sharing 112. Various formats and contents of reference databases 210 are readily devised in keeping with the teachings disclosed herein.

With a partitioned deduplication pool 106, backups can be performed with deduplication via the various groups 110 (see FIG. 1). Each backup from a client-policy pair 202 is performed via a corresponding group 110 of data containers 102. The group 110 of data containers 102 has at least one data container 102 that references a backup image 204 from the client-policy pair 202, e.g., a backup image 204 made previously. Performing backups in this manner makes use of the data sharing 112 in the group 110, so that deduplication during the backup run proceeds efficiently. When the deduplication pool 104 is partitioned into groups 110 of data containers 102, reference databases 210 specific to each group 110 are generated from the reference database 210. Each time one of the groups 110 is partitioned, a reference database 210 specific to each new group 110 is generated from the reference database 210 of that parent group 110. In some embodiments, the fingerprint index 208 is likewise applied to generate fingerprint indexes 208 specific to the new groups 110.

If backup for a new client-policy pair 202 is to be performed, the deduplication system selects which of the groups 110 of data containers 102 is a best fit for the backup. This can be accomplished by taking a sample of data from the client-policy pair, e.g., a sampling of segments of data of the backup run, and forming fingerprints of this data sample. The fingerprints are queried against the fingerprint index 208 of each group 110 of data containers 102, to find out which group 110 and associated fingerprint index 208 has more fingerprint lookup hits, i.e., matches to fingerprints. The group 110 having the most hits becomes the group 110 that backups from this client-policy pair 202 utilize for deduplication. If there is no lookup hit from either or any group 110, the smaller group 110 is selected as the one that the backups from the client-policy pair 202 utilize for deduplication. Selecting the smaller group 110 can also be applied as a tiebreaker, in the event that there are equal numbers of matches to the fingerprints, in two or more groups 110.

FIG. 3 is a chart 300 showing data sharing 112 among containers 102 referenced by various client-policy pairs 202, as applicable to the partitioning shown in FIG. 1. The chart 300 can be produced by examination of the reference database 210 as described above in some embodiments. For example, a processor of a deduplication system could produce the chart 300, or could produce a representation of the information shown in the chart 300 in memory coupled to the processor. From this information, the deduplication system determines how to partition the deduplication pool 104 into groups 110, or partition one or more of the groups 110 into further groups 110. In the chart 300, relationships of data sharing 112 or no data sharing among data containers 102 referenced by client-policy pairs 202 are shown. The lower left half of the chart 300 may not be used in some embodiments as this is a mirror image of the upper right half of the chart 300. The chart is populated with checkmarks indicating data sharing 112 among containers 102 that reference client-policy pairs 202 per the left side and top of the chart 300.

Figure 4:
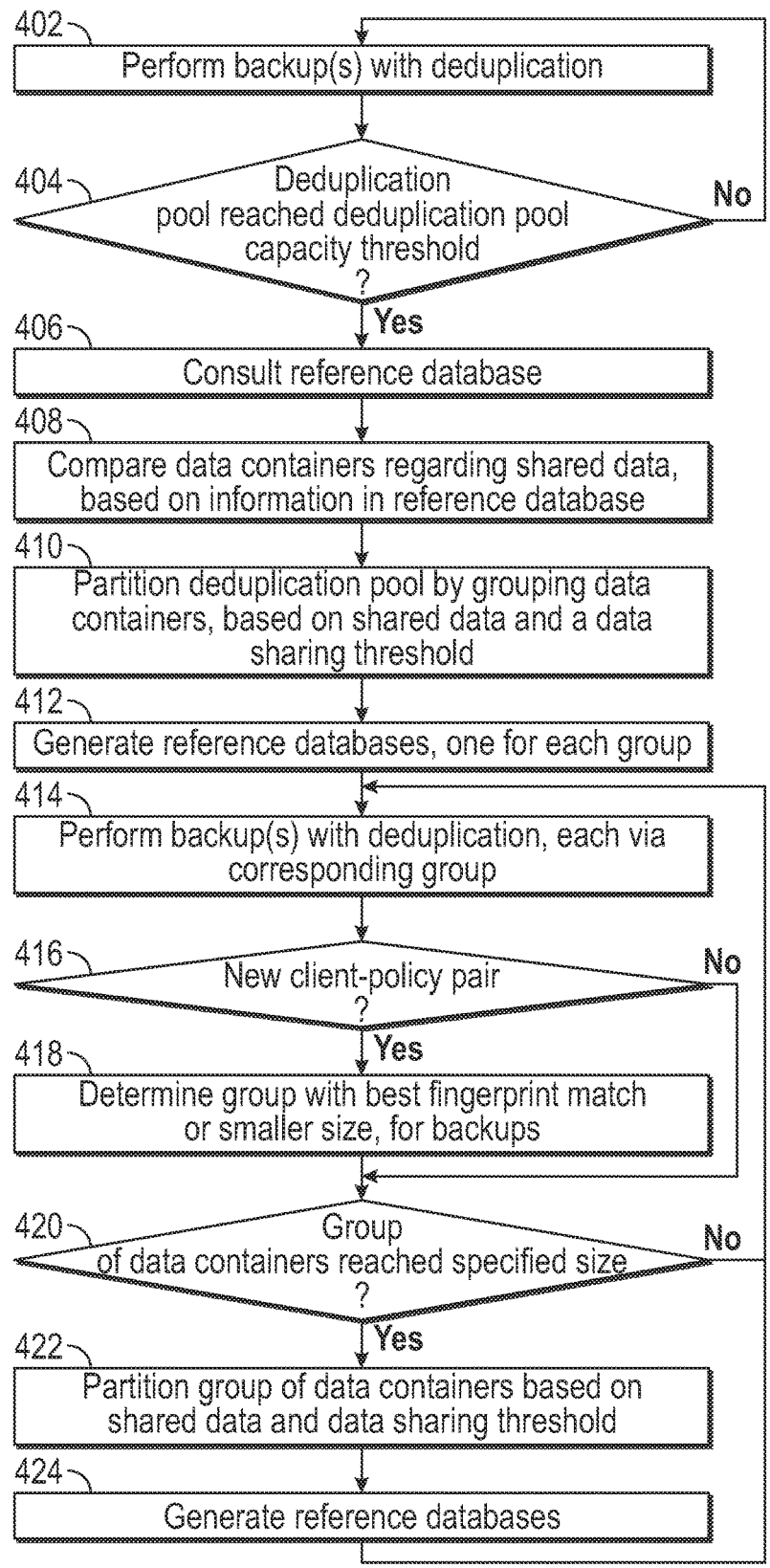
FIG. 4 is a flow diagram of a method for partitioning a deduplication pool, which can be practiced on or by embodiments depicted in FIGS. 1-3 in accordance with some embodiments.

FIG. 4 is a flow diagram of a method for partitioning a deduplication pool, which can be practiced on or by embodiments depicted in FIGS. 1-3. Portions or all of the method can be performed by a processor, such as a processor in a deduplication system. Portions or all of the method can be embodied in a computer-readable media. One or more backups are performed with deduplication, in an action 402. In a decision action 404, it is determined if the deduplication pool reached the deduplication pool capacity threshold. The deduplication pool capacity threshold could be set or adjusted as described above in some embodiments. If the deduplication pool capacity threshold has not been reached, flow branches back to the action 402, in order to continue performing backups with deduplication. If the deduplication pool capacity threshold has been reached or exceeded, flow proceeds to the action 406, to begin partitioning the deduplication pool.

In the action 406, the reference database is consulted. Example contents of a reference database, and relevance of the reference database to determination of data sharing are discussed above with reference to FIGS. 2 and 3. Data containers are compared regarding shared data, based on information in the reference database, in an action 408. Results of the comparing indicate which data containers share data to an extent that is greater than or equal to a data sharing threshold, and which data containers share data to an extent that is less than the data sharing threshold. The deduplication pool is partitioned by grouping data containers, based on shared data and the data sharing threshold, in an action 410. Each group has containers with data sharing in the group. Groups have data sharing less than the data sharing threshold or no data sharing from group to group. Backups are performed with deduplication, each via a corresponding group, in an action 414. Each backup from a client-policy pair is performed via a group that has one or more data containers referencing at least one previous backup image from the same client-policy pair.

In a decision action 416, it is determined if there is a new client-policy pair. If the answer is no, flow branches to the decision action 420. If the answer is yes, there is a new client-policy pair, flow proceeds to the action 418. In the action 418, a group of data containers with the best fingerprint match or a smaller size is identified for backups from the new client-policy pair. A group having data containers with the best fingerprint match to a sample of data from the new client-policy pair may be utilized for the backup, but if there is no such group, or if the groups have equal fingerprint matches to a sample of data from the new client-policy pair, a tiebreaker is applied and the smaller size group is selected in some embodiments. In a decision action 420, it is determined if a group of data containers reached a specified size. This could be the same size as the deduplication pool capacity threshold, or a differing threshold could be established. If the answer is no, flow branches back to the action 414, to perform additional backups with deduplication. If the answer is yes, flow proceeds to the action 422. In the action 422, the group of data containers is partitioned based on shared data and a data sharing threshold. This data sharing threshold could be the same data sharing threshold as applied in the initial partitioning of the deduplication pool, or could be another threshold. The data sharing threshold could be adjusted periodically or set as described above. Reference databases are generated for the new groups resulting from partitioning the group, in an action 424. Flow then proceeds back to the action 414, to perform further backups with deduplication and repeats as described above.

Figure 5:
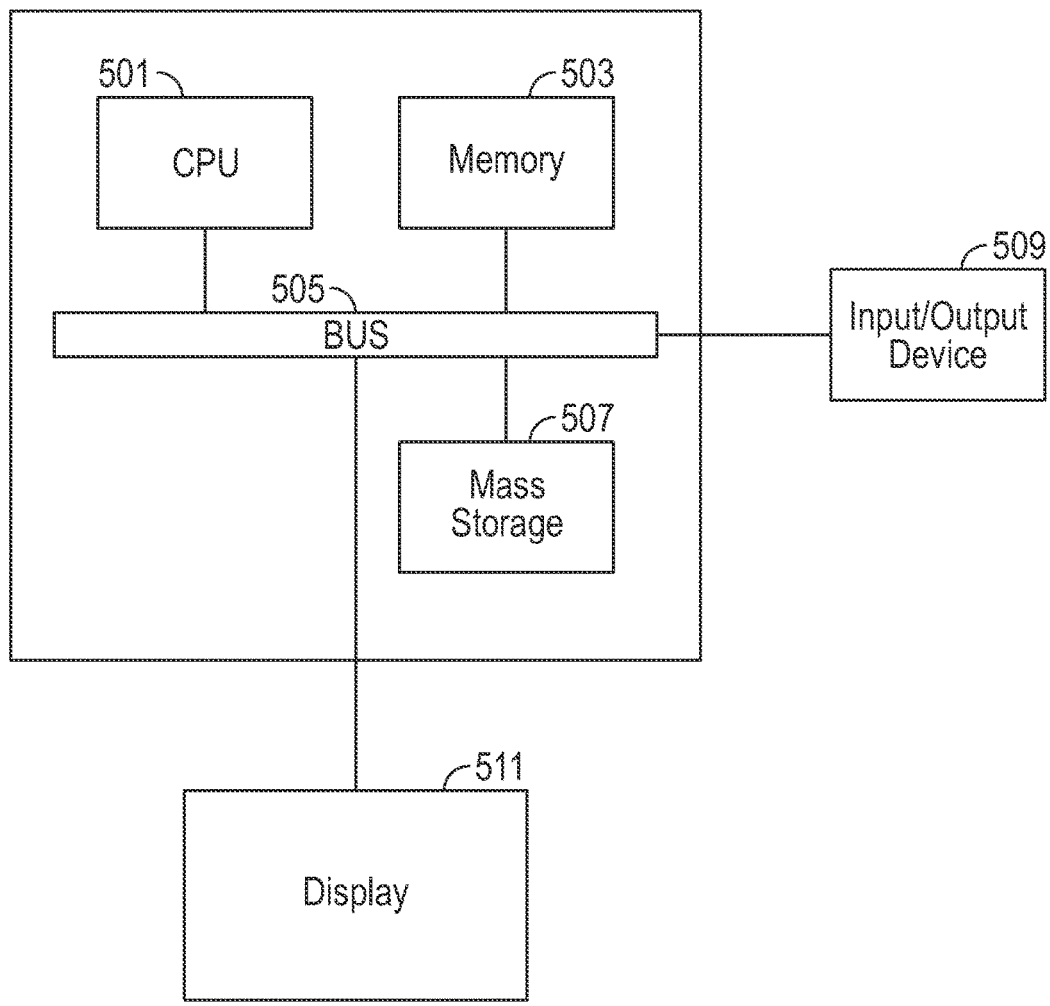
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for deduplication and partitioning of a deduplication pool in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method to partition a deduplication pool, the method comprising:
    determining that an amount of data in a plurality of data containers of the deduplication pool has reached a data capacity threshold;
    comparing each data container of the plurality of data containers with at least one other of the plurality of data containers as to amount of shared data; and
    grouping, based on results of the comparing, the plurality of data containers into a plurality of groups of data containers, with at least two data containers in each group having an amount of data segments referenced by a set of backup images or files greater than or equal to a data sharing threshold, and a further at least two data containers in differing groups having an amount of data segments referenced by a further set of backup images or files less than the data sharing threshold, wherein at least one method operation is executed through a processor.

2. The method of claim 1, wherein at least one of the comparing or the grouping is based on a reference database that records which backup images reference segments stored in which data containers.

3. The method of claim 1, further comprising:
    setting the data sharing threshold, based on one of: how many groups of the data containers are to be formed in the grouping, a capacity of at least one of the plurality of data containers, a total capacity of the plurality of data containers, or a relative utilization of at least one of the plurality of data containers.

4. The method of claim 1, wherein the grouping comprises:
    identifying a first container and a second container, the first container and the second container sharing data;
    duplicating data from the second container that is shared with the first container, the duplicated data stored within a third container; and
    deleting the shared data from the second container.

5. The method of claim 1, wherein the comparing and the grouping are performed in parallel across at least a subset of the plurality of data containers.

6. The method of claim 1, wherein the grouping includes:
    placing a first data container and a second data container into differing ones of the plurality of groups of data containers, responsive to the first data container and the second data container having data sharing less than the data sharing threshold.

7. The method of claim 1, further comprising:
    performing a backup from a client-policy pair via a one of the plurality of groups of data containers, based on the one of the plurality of groups of data containers referencing previous backup images from the client-policy pair.

8. A non-transitory, tangible, computer-readable media having instructions thereupon which, when operated by a processor, cause the processor to perform actions comprising:
    determining which pairs of data containers from a plurality of data containers with data from data deduplication have data sharing greater than a threshold and which pairs of data containers from the plurality of data containers have data sharing less than the threshold; and
    partitioning the plurality of data containers into a plurality of sets of data containers according to the determining, wherein each pair of data containers that has data sharing greater than the threshold has both data containers of the pair of data containers in a same one of the plurality of sets of data containers, and wherein each pair of data containers that has data sharing less than the threshold has each data container of the pair of data containers in a differing one of the plurality of sets of data containers.

9. The computer-readable media of claim 8, wherein the determining is based on a reference database configured to hold information pertaining to: the plurality of data containers, a plurality of backup images made with deduplication via the plurality of data containers, and a plurality of client-policy pairs from which the plurality of backup images were made.

10. The computer-readable media of claim 8, wherein the actions further comprise:
   performing a backup from a client-policy pair, with deduplication via a one of the plurality of sets of data containers, responsive to a determination that the one of the plurality of sets of data containers references at least one previous backup image from the client-policy pair.

11. The computer-readable media of claim 8, wherein the actions further comprise:
   generating a plurality of reference databases from a reference database of the plurality of data containers, with each of the plurality of reference databases specific to a one of the plurality of sets of data containers.

12. The computer-readable media of claim 8, wherein the actions further comprise:
   determining that one of the plurality of sets of data containers approaches or exceeds a specified size; and
   partitioning the one of the plurality of sets of data containers into further sets of data containers in a related manner as the partitioning the plurality of data containers into the plurality of sets of data containers.

13. The computer-readable media of claim 8, wherein the actions further comprise:
   forming fingerprints of at least a portion of data of a client-policy pair;
   determining, from fingerprint indexing of each of the plurality of sets of data containers, which set of the plurality of sets of data containers has more fingerprint lookup hits; and
   performing a backup from the client-policy pair, with deduplication via the set of the plurality of sets of data containers having the more fingerprint lookup hits.

14. The computer-readable media of claim 8, wherein the actions further comprise:
   forming fingerprints of at least a portion of data of a client-policy pair;
   determining, from fingerprint indexing of each of the plurality of sets of data containers, that none of the plurality of sets of data containers has fingerprint lookup hits exceeding a specified amount;
   determining one of the plurality of sets of data containers has a smaller size than at least one other of the plurality of sets of data containers; and
   performing a backup of the data of the client-policy pair, with deduplication, via the one of the plurality of sets of data containers having the smaller size.

15. A deduplication system, comprising:
   a plurality of data containers configured to store data segments from deduplication of data and configured to serve as a deduplication pool; and
   a processor, configured to perform actions including:
      comparing each of the plurality of data containers to others of the plurality of data containers as to data sharing; and
      partitioning the plurality of data containers into a plurality of groups of data containers, such that two or more data containers in each one of the plurality of groups contains an amount of data segments referenced by a set of backup images or files greater than or equal to a data sharing threshold, and data containers of differing ones of the plurality of groups contain an amount of data segments referenced by a further set of backup images or files less than the data sharing threshold.

16. The deduplication system of claim 15, further comprising:
   a reference database coupled to the plurality of data containers and the processor, the reference database configured to indicate backup images referencing each data container, and clients or client-policy pairs from which the backup images originate.

17. The deduplication system of claim 15, wherein differing ones of the plurality of groups of data containers are referenced by backup images from differing client-policy pairs.

18. The deduplication system of claim 15, wherein each of the plurality of data containers is configured to store data segments referenced by backup images, and wherein each backup image is from a client-policy pair.

19. The deduplication system of claim 15, wherein the actions which the processor is configured to perform further include:
   splitting a one of the plurality of groups of data containers into further groups of data containers, responsive to the one of the plurality of groups of data containers exceeding a specified utilization.

20. The deduplication system of claim 15, further comprising:
   the processor and the plurality of data containers configured to perform a backup from a first client-policy pair with deduplication against data segments within a one of the plurality of groups of data containers that has a plurality of data segments, from at least one previous backup, referencing the first client-policy pair.

\* \* \* \* \*